United States Patent [19]

Tyciak et al.

[11] Patent Number: 5,474,311
[45] Date of Patent: Dec. 12, 1995

[54] VEHICLE BENCH SEAT RETRACTABLE WHEEL CARRIAGE

[75] Inventors: Andrew Tyciak, Dryden; William Bonner, Troy; Terence J. O'Sullivan, Shelby Township; Edward W. Clancy, III, Livonia; Joseph M. Heilig, Clinton Township; Rose A. Filar, Rochester Hills; George S. Popa, Troy; Herbert J. Keller, Shelby Township, all of Mich.

[73] Assignee: Invenio Corporation, Warren, Mich.

[21] Appl. No.: 201,890

[22] Filed: Feb. 25, 1994

[51] Int. Cl.⁶ ............. B60F 5/00; B62D 33/077; B60N 2/04; B60N 2/32

[52] U.S. Cl. ............. 280/30; 280/43.14; 280/43.17; 280/43.24; 296/65.1; 296/69

[58] Field of Search ............. 280/30, 43.13, 280/43.14, 43.17, 43.24; 296/65.1, 67, 69; 297/118; 248/340

[56] References Cited

U.S. PATENT DOCUMENTS

| | | |
|---|---|---|
| 165,965 | 7/1875 | West. |
| 425,654 | 4/1890 | Brown ............. 280/43.13 X |
| 1,973,372 | 9/1934 | Clapp ............. 280/43.14 |
| 2,152,946 | 4/1939 | Barltrop ............. 254/10 |
| 2,568,822 | 9/1951 | Pervis ............. 280/43.13 X |
| 2,624,590 | 1/1953 | Tilton ............. 280/43.14 |
| 2,812,189 | 11/1957 | Geldhof ............. 280/43.14 |
| 3,041,081 | 6/1962 | Lott ............. 280/30 |
| 4,198,091 | 4/1980 | Appleton ............. 296/69 X |
| 4,762,331 | 9/1988 | Tucker et al. ............. 280/30 |
| 4,815,760 | 3/1989 | Dooley ............. 280/43.24 |
| 4,828,281 | 5/1989 | Sanchas ............. 280/30 |
| 4,872,693 | 10/1989 | Kennel ............. 280/30 |
| 4,874,182 | 10/1989 | Clark ............. 280/30 |
| 4,878,680 | 11/1989 | Molnar ............. 280/30 |
| 4,989,888 | 2/1991 | Qureshi et al. ............. 280/30 |
| 5,372,398 | 12/1994 | Aneiros et al. ............. 296/65.1 X |

FOREIGN PATENT DOCUMENTS 68999 3/1930 Sweden ............. 280/43.24

*Primary Examiner*—Brian L. Johnson
*Attorney, Agent, or Firm*—Reising, Ethington, Barnard & Perry

[57] ABSTRACT

A right and left hand retractable wheel carriage for a removable vehicle bench seat opposite end latching mechanism. Each carriage includes mounting brackets, caster brackets interconnected by a link, associated casters, and a suitable spring for urging the casters apart and into engagement with the vehicle floor to prevent the casters from rattling during operation of the vehicle. Once the seat's latching mechanism is released, the spring forces the casters into a vertical orientation to thereby lift the bench seat to facilitate manually rolling it out of the vehicle, and then along the ground or floor.

11 Claims, 3 Drawing Sheets

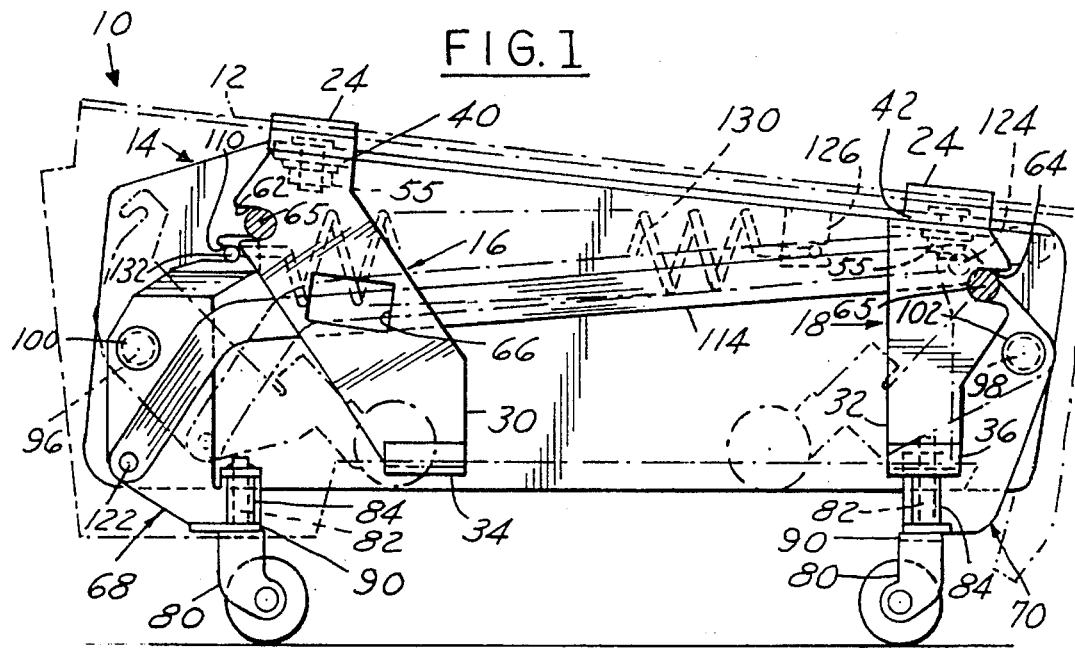
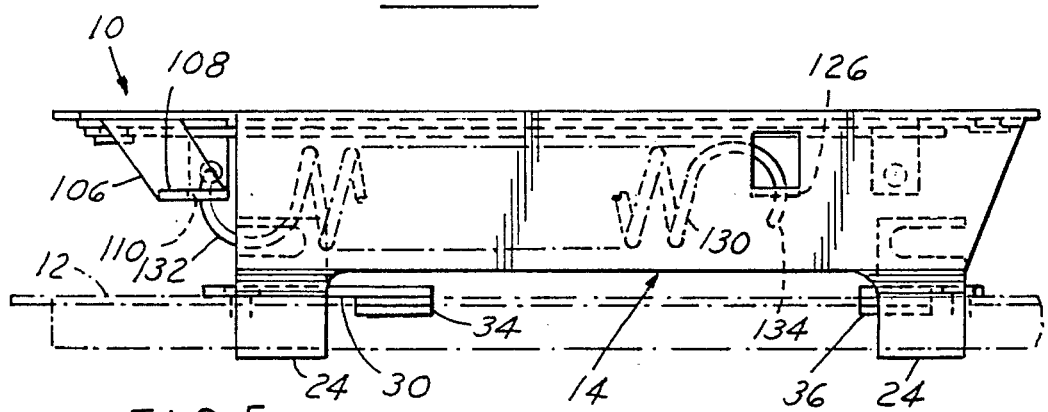
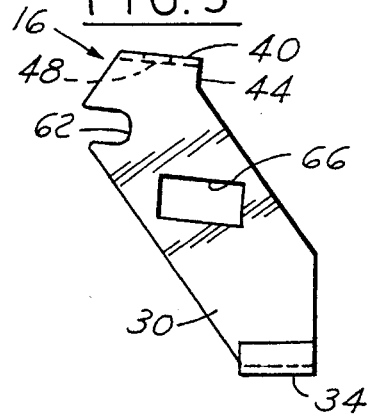
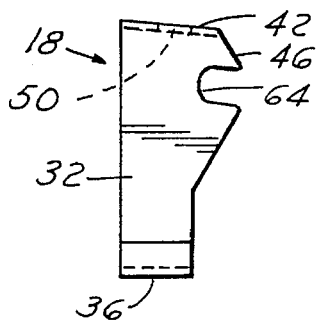

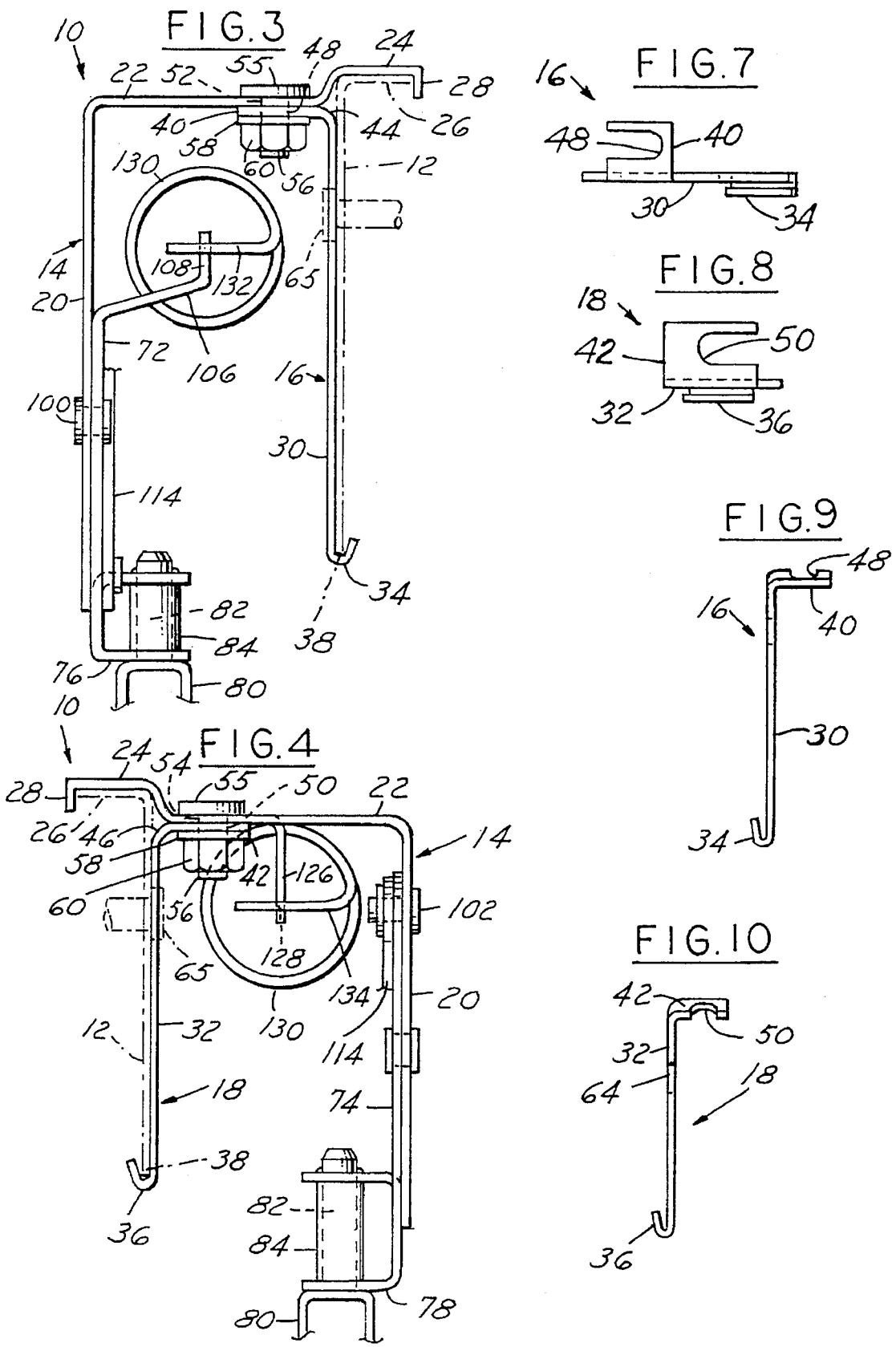

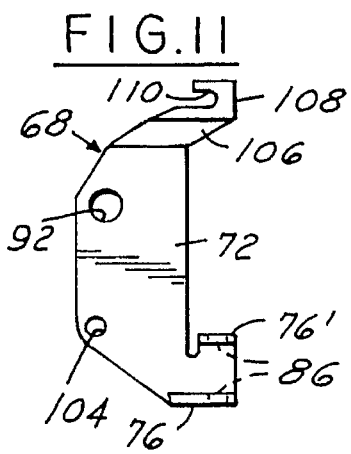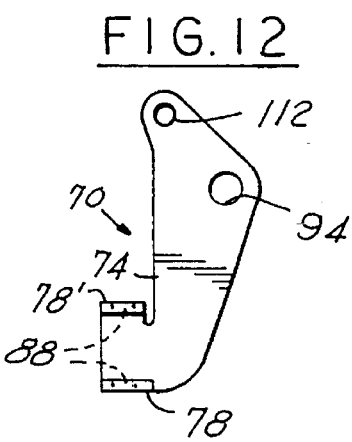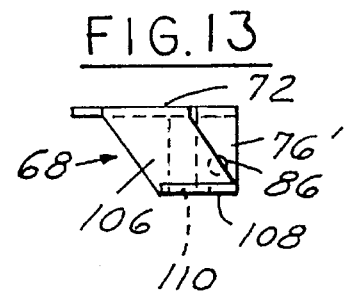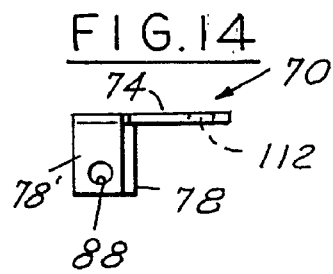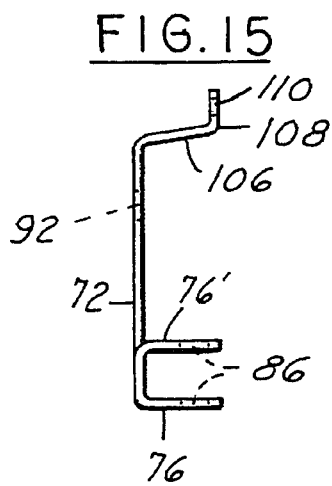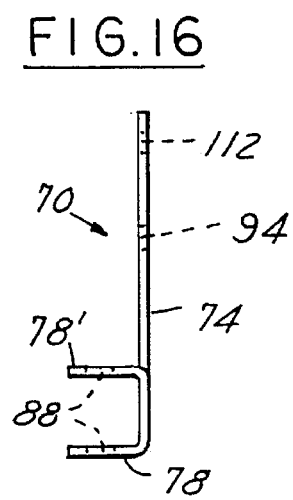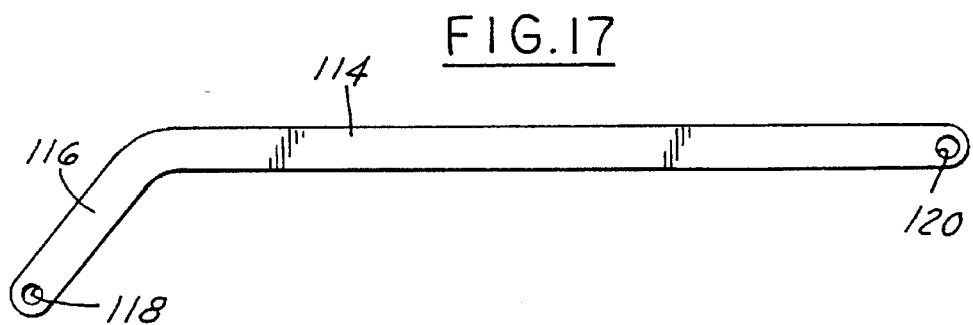

VEHICLE BENCH SEAT RETRACTABLE WHEEL CARRIAGE

TECHNICAL FIELD

This invention relates generally to retractable wheel carriages for bulky, normally static, articles and, more particularly, to such carriages adaptable for mounting on removable vehicle bench seats in order to more easily handle the moving of same.

BACKGROUND ART

Caster assemblies for moving articles, such as applications, furniture, and work-benches, and the like, are known. For example, West patent no. 165,965 discloses outside and inside bars which work upon each other through a pair of inclined slots, via a manual lever to raise or lower sewing machine casters.

Barltrop patent no. 2,152,946 discloses an attachment frame adapted to be secured to an article of furniture, including two longitudinal and two transverse bars; and a transverse equalizer bar having two springs connected between the opposite ends thereof and pivotable links and a tension member connected between the center of the equalizer bar and a fixed point. The springs continually urge four castors downwardly. The castors are brought into operation by upward force applied externally by the user, thereby neutralizing a part of the weight of the furniture.

Tilton patent no. 2,624,590 discloses a portable workstand having a system of pivotal links springs and levers for manually raising and lowering casters.

Geldhof patent no. 2,812,189 discloses a caster assembly for a washing machine, including front and rear pivotable links, interconnected at their upper ends by a tie link, with a spring connected between one of the pivotable links and the frame. Caster supporting shafts connected to the lower ends of the pivotable links are raised or lowered by an operating lever secured in either of two positions by a locking pin.

Lott patent no. 3,041,081 discloses a system of chair-supporting frame, links, brackets, and lever for manually raising and lowering four wheels.

Tucker et al patent no. 4,762,331 discloses a combination automobile seat and stroller including retractable wheels on a pivotally mounted frame actuated by a handle having an extension tab for selectively engaging upper or lower detents for respective raised and lowered positions.

Dooley patent no. 4,815,760 discloses an undercarriage arrangement for an article, such as a workbench, including a pair of wheels on pivotable arms adapted to being raised and lowered by a lever connected to one of the arms by a tension spring and rotatable through 180°.

Sanchas patent no. 4,828,281 discloses a child safety car seat having front and rear wheels connected to the seat by a pair of pivotally interconnected scissor links.

Kennel patent no. 4,872,693 discloses a combination infant car seat and stroller including a vertically movable central element connected at its ends to inner ends of respective extensions having wheels connected to the outer ends thereof, and adapted to pivoting the wheels inwardly and outwardly by raising and lowering the central element.

Clark patent no. 4,874,182 discloses an apparatus for converting a child's car seat into a mobile stroller unit, including two sets of each of front and rear linkage members operable by a central transverse drive rod controlled by an actuating lever and a cooperating latching mechanism.

Molnar patent no. 4,878,680 discloses a convertible car seat and stroller including a telescopic handle slidably mounted within supporting tubes to operate a cable arrangement for pivotally retracting and extending a wheel structure.

Qureshi et al patent no. 4,989,888 discloses a further combination child car seat and stroller, including pivotally mounted front and rear struts having front and rear wheels rotatably attached, and front and rear lock bars and associated cams having stepped lobes thereon for alternate engagement by the respective lock bards, with the struts and wheels moving to the their fully extended position by a combination of gravitational force and the force of a strut spring.

DISCLOSURE OF THE INVENTION

A general object of the invention is to provide a retractable wheel carriage which is adaptable to being mounted on a conventional removable vehicle bench seat floor latching mechanism.

Another object of the invention is to provide an improved retractable wheel carriage which, when mounted on a vehicle bench seat floor latching mechanism, automatically lifts the bench seat to permit rolling movement thereof upon the release of the seat's floor latching mechanism.

A further object of the invention is to provide right and left hand retractable wheel carriages for vehicle bench seat opposite end latching mechanisms, including caster brackets and associated casters, and spring means for urging the casters into engagement with the vehicle floor to prevent the casters from rattling during operation of the vehicle while carrying the latched-in bench seat.

Still another object of the invention is to provide right and left hand retractable wheel carriages for vehicle bench seat opposite end latching mechanisms, each carriage including a housing and a pair of mounting brackets threadedly interconnected and adapted to respectively hook onto upper and lower edges of a respective latching mechanism, front and rear caster brackets each pivotally mounted on the housing, a link between the upper portion of one caster bracket and the lower portion of the second caster bracket, a caster mounted on each caster bracket, and a spring connected between the upper portion of the second caster bracket and the housing for urging the casters apart into vertical positions for rolling.

These and other objects and advantages will become more apparent when reference is made to the following drawings and the accompanying description.

BRIEF DESCRIPTION OF THE DRAWINGS

FIG. 1 is a side elevational view of-the invention;

FIG. 2 is a top view of the FIG. 1 structure;

FIGS. 3 and 4 are respective left and right end views of the FIG. 1 structure;

FIGS. 5 and 6 are side elevational views of respective front and rear mounting brackets included in the FIG. 1 structure;

FIGS. 7 and 8 are top views of the respective FIGS. 5 and 6 mounting brackets;

FIGS. 9 and 10 are right end views of the respective FIGS. 5 and 6 mounting brackets;

FIGS. 11 and 12 are side elevational views of respective front and rear caster brackets included in the FIG. 1 structure;

FIGS. 13 and 14 are top views of the respective FIGS. 11 and 12 caster brackets;

FIGS. 15 and 16 are respective left end and right end views of the respective FIGS. 11 and 12 caster brackets; and FIG. 17 is a side elevational view of a link member included in the FIG. 1 structure.

BEST MODE OF CARRYING OUT THE INVENTION

Referring now to the drawings in greater detail, FIGS. 1–4 illustrate a vehicle bench seat retractable wheel carriage 10 adaptable for use with a side wall, represented as 12, of one side of a floor latching apparatus (not shown) of a bench seat for a vehicle, such as the third seat of a, so-called, minivan, for example. The latching and unlatching operation of the bench seat floor latching apparatus will not be explained here, since such operation is explained in each owner's manual.

The retractable wheel carriage 10 includes, for each of the two oppositely disposed side walls 12, a housing 14 secured to each side wall by a front clamp-on type bracket 16 (FIGS. 5, 7 and 9) and a rear clamp-on type bracket 18 (FIGS. 6, 8 and 10). More specifically, the housing 14 is formed to include a vertical wall 20, with a top wall 22 extending to one side from the upper end thereof, and having a bent end portion 24 shaped as required to mount over an upper end 26 of the existing side wall 12. A downward-turned flange 28 on the distal end of the bent end portion 24 retains the housing 14 in place on the side wall 12. The front and rear brackets 16 and 18 respectively include a wall portion 30 and 32 for abutting against the outer surface of the respective side walls 12, a hook-like lower end 34 and 36 adapted to engage the lower edge 38 of the side wall 12, and a lateral mounting flange 40 and 42 extending from the upper end portion 44 and 46 of the respective wall portions 30 and 32 and abutting against the inner surface of the top wall 22. Openings 48 (FIG. 7) and 50 (FIG. 8) are formed in the respective flanges 40 and 42, aligned with openings 52 and 54 formed in the top wall 22. Fasteners 55 (FIGS. 3 and 4), such as bolts 56, washers 58, and nuts 60 are threadedly secured through each of the aligned openings 48/52 and 50/54. Slots 62 and 64 are formed in the respective front and rear brackets as required to fit around any rivets or other fasteners, represented as 65 in FIGS. 1, 3 and 4, which may be mounted through the side wall 12. If required, rectangular or other shaped openings, such as the opening 66 shown in the bracket 16, may be formed in either or both the brackets 16 and 18 to accommodate any levers or other parts of a bench seat floor latching apparatus which may extend through the side wall 12.

Also secured to the housing 14 are a front caster bracket 68 (FIGS. 11, 13 and 15) and a rear caster bracket 70 (FIGS. 12, 14 and 16). The latter brackets 68 and 70 respectively include vertical walls 72 and 74 for abutting against inner surface portions of the housing 14 vertical wall 20, and lower flanges 76 and 78 formed as required to have any suitable rolling and pivotable wheel castors 80 (FIG. 1) secured thereto. The castors 80 may typically include a stem 82 for extending through a sleeve 84 mounted in aligned openings 86 and 88 formed in dual spaced-apart flanges 76/76' and 78/78' or may include a flange 90 for being secured to the bottom surface of single lower flanges 76 and 78.

The front and rear caster brackets 68 and 70 respectively include openings 92 and 94, aligned with respective openings 96 and 98 formed in the housing 14 vertical wall 20 so as to be pivotally mounted thereon by suitable pivot pins 100 and 102.

The front caster bracket 68 further includes a second opening 104 formed through the lower portion thereof, and an inwardly bent flange 106 formed on the upper end portion thereof, with an up-turned end 108 formed on the inner end of the flange 106 and having a slot 110 formed in a side edge of the up-turned end, for a purpose to be described. The rear caster bracket 70 incudes a second opening 112 formed in an upper end portion thereof.

A longitudinally extending link member 114 (FIG. 17) includes a downwardly sloped front end portion 116, with openings 118 and 120 formed in the respective front and rear ends of the link member. The openings 118 and 120 align with the openings 104 and 112 in the respective front and rear caster brackets 68 and 70, and are secured thereto by suitable fasteners, represented in FIG. 1 as 122 and 124, respectively.

As shown in FIG. 4, a spring mounting flange 126 is cut and turned downwardly from the top wall 22 of the housing 14 at the rear of the latter. An opening 128 is formed through the flange 126. A coil spring 130 includes hook-like ends 132 and 134 formed thereon for mounting in the slot 110 of the front caster bracket 68 and the opening 128 of the flange 126, respectively. When the bench seat floor latching apparatus is latched in the usual seat mounting wells (not shown), the castor brackets 68 and 70 are pivoted toward one another, as shown in the phantom line position in FIG. 1, against the force of the spring 130. When the bench seat latching mechanism is unlatched, the castor brackets 68 and 70 are forced apart by the spring 130, to the solid line position shown in FIG. 1, as will be explained in the operation.

It is apparent that the retractable wheel carriage 10 on the oppositely disposed sides of the bench seat floor latching apparati side walls 12 are opposite hand arrangements.

At assembly, it is only necessary to mount the bent end portion 24 of the housing 14 over the upper end 26 of each side wall 12, followed by mounting the hook-like lower ends 34 and 36 of the respective front and rear brackets 16 and 18 on the lower edge 38 of each side wall 12, and then securing each with the fasteners 55.

In operation, once assembled as described above, the spring 130 serves to urge the front and rear caster brackets 68 and 70 away from one another through the pivotal actuation of the front caster bracket 68, the link 114, and the rear caster bracket 70, thereby forcing the casters 80 downwardly against the surface of the vehicle floor adjacent the usual seat mounting wells (not shown) formed in the floor for the usual floor latching apparatus. This prevents any rattling of the casters 80 during operation of the vehicle. Further, when it is desired to remove the bench seat from the vehicle the floor latching apparatus is manually released in the normal manner. The springs 130 will then be free to urge the casters 80 further apart, i.e., from the phantom line position in FIG. 1 into the vertical solid line position shown, thereby raising the bench seat structure. The bench seat is now free to be rolled out of the vehicle and placed onto the floor where it is able to be rolled to a storage location as desired, rather than having to be dragged or carried.

INDUSTRIAL APPLICABILITY

It should be apparent that the invention provides a novel vehicle bench seat retractable wheel carriage which may be attached to a conventional bench seat floor latching mechanism as after market equipment, without any changes required for the seat's latching mechanism, or, if desired, may be readily incorporated as a part of the floor latching mechanism as original equipment by securing the housing directly to the floor latching mechanism.

It should be further apparent that the assembly of the invention is such that the casters of the invention are urged downwardly into a non-rattling, tight contact with the floor when the floor latching mechanism is engaged in the floor, and then urged further downwardly relative to the carriage housing into a vertical mode, thereby lifting the floor latching mechanism above the floor level when the latching mechanism is disengaged from the floor, for rolling movement out of the vehicle and continued rolling movement on any external floor or ground surface after the bench seat is lowered onto such external floor or ground surface.

It should be still further apparent that the coil spring of the invention could be replaced by other suitable resilient means.

While but one embodiment of the invention has been shown and described, other modifications are possible within the scope of the following claims.

What is claimed is:

1. A retractable wheel carriage for use on a vehicle bench seat floor latching mechanism, said retractable wheel carriage comprising a housing adapted to mount on the floor latching mechanism, connector means for connecting the housing to the floor latching mechanism, first and second caster brackets, each pivotally mounted on said housing, a caster mounted on each caster bracket, a link pivotally connected between said first and second caster brackets, and resilient means connected between said first caster bracket and said housing for urging said casters downwardly, wherein said connector means including mounting bracket means including a first and a second bracket, each having a hook end adapted to hook onto a lower edge portion of the floor latching mechanism, and said housing includes a clamp end adapted to clamp onto an upper edge portion of the floor latching mechanism, and fastener means between said housing and each of said first and second brackets for interconnecting said housing and said brackets.

2. The retractable wheel carriage described in claim 1, wherein said caster brackets each have lower and upper portions, and said link is pivotally connected between a lower portion of said first caster bracket and an upper portion of said second caster bracket, and said resilient means is connected to an upper portion of said first caster bracket and to said housing so as to urge said casters apart and downwardly.

3. The retractable wheel carriage described in claim 1, wherein said caster brackets are pivoted against the force of said resilient means so as to urge said casters toward one another the floor latching mechanism is latched.

4. The retractable wheel carriage described in claim 1, wherein said housing and said first and second brackets include aligned openings, and said fastener means includes a bolt and nut threadedly connected through each of said aligned openings.

5. The retractable wheel carriage described in claim 1, wherein said resilient means includes a coil spring.

6. A retractable wheel carriage for a vehicle bench seat having a floor latching mechanism, said retractable wheel carriage comprising a housing including an upper contoured edge adapted to clamp onto the floor latching mechanism and a pair of perforated flanges, front and rear mounting brackets, each including a U-shaped lower edge adapted to hook onto the floor latching mechanism and an upper perforated flange, a pair of fasteners secured through said housing and mounting bracket perforated flanges, front and rear caster brackets pivotally mounted on said housing, a caster rotatably and pivotally mounted on the lower end of each caster bracket, an opening formed in each of said front caster bracket and said rear caster bracket, a link pivotally connected at opposite ends thereof to said respective caster bracket openings, a slot formed in a forward edge of the upper portion of said front caster bracket, a mounting flange formed in said housing, and tension spring means connected between said mounting flange and said slot for urging said casters downwardly.

7. The retractable wheel carriage described in claim 6, wherein said tension spring means is a coil spring having bent ends connected to said mounting flange and said slot.

8. A retractable wheel carriage for use on a vehicle bench seat floor latching mechanism, said retractable wheel carriage comprising a housing adapted to mount on the floor latching mechanism, connector means for connecting the housing to the floor latching mechanism, first and second caster brackets, each pivotally mounted on said housing, a caster mounted on each caster bracket, a link pivotally connected between said first and second caster brackets, and resilient means connected between said first caster bracket and said housing for urging said casters downwardly, wherein said connector means includes mounting bracket means having an end adapted to connect onto a first portion of the floor latching mechanism, and said housing includes an end adapted to connect onto a second portion of the floor latching mechanism, and fastener means between said housing and said mounting bracket means for interconnecting said housing and said mounting bracket means.

9. The retractable wheel carriage described in claim 8, wherein said end of said mounting bracket means is a hook end adapted to hook onto a first edge portion of the floor latching mechanism, and said end of said housing is a clamp end adapted to clamp onto a second edge portion of the floor latching mechanism.

10. The retractable wheel carriage described in claim 9, wherein said first edge portion is a lower edge portion, and said second edge portion is an upper edge portion.

11. The retractable wheel carriage described in claim 8, wherein said mounting bracket means includes first and second brackets, and said housing and said first and second brackets include aligned openings, and said fastener means includes a bolt and nut threadedly connected through each of said aligned openings.

* * * * *